(12) United States Patent
Ito et al.

(10) Patent No.: US 11,396,310 B2
(45) Date of Patent: Jul. 26, 2022

(54) VEHICLE CONTROL SYSTEM, VEHICLE CONTROLLER DEVICE AND VEHICLE CONTROL METHOD

(71) Applicant: TOYOTA JIDOSHA KABUSHIKI KAISHA, Toyota (JP)

(72) Inventors: Yuki Ito, Iwakura (JP); Tsukasa Nakanishi, Nagoya (JP); Yuta Morikawa, Miyoshi (JP); Naoki Yamamuro, Nagoya (JP); Yuki Tatsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 16/908,900

(22) Filed: Jun. 23, 2020

(65) Prior Publication Data
US 2021/0024093 A1  Jan. 28, 2021

(30) Foreign Application Priority Data
Jul. 23, 2019 (JP) .............................. JP2019-135286

(51) Int. Cl.
*B60W 60/00* (2020.01)
*G05D 1/12* (2006.01)
*G05D 1/00* (2006.01)
*B60W 50/14* (2020.01)

(52) U.S. Cl.
CPC ........ *B60W 60/0025* (2020.02); *B60W 50/14* (2013.01); *B60W 60/0053* (2020.02); *G05D 1/0011* (2013.01); *G05D 1/12* (2013.01)

(58) Field of Classification Search
CPC ......... B60W 60/0025; B60W 60/0053; B60W 50/14; G05D 1/12; G05D 1/0011
See application file for complete search history.

(56) References Cited

U.S. PATENT DOCUMENTS

| | | | |
|---|---|---|---|
| 9,964,948 B2 | 5/2018 | Ullrich et al. | |
| 11,040,828 B1 * | 6/2021 | Ward | B60P 1/04 |
| 2018/0099676 A1 * | 4/2018 | Goto | B60W 30/10 |
| 2018/0203465 A1 * | 7/2018 | Suzuki | B64D 45/04 |
| 2018/0244174 A1 * | 8/2018 | Tan | B60N 2/22 |
| 2018/0335783 A1 * | 11/2018 | Sweeney | B60W 60/005 |
| 2018/0356823 A1 * | 12/2018 | Cooper | G01C 21/20 |
| 2019/0066516 A1 * | 2/2019 | Kuhara | G08G 1/202 |
| 2020/0150646 A1 * | 5/2020 | Sugimoto | H04W 4/02 |
| 2020/0290601 A1 * | 9/2020 | Yamanaka | B60W 50/0205 |
| 2021/0370989 A1 * | 12/2021 | Morimura | B60P 3/007 |

* cited by examiner

*Primary Examiner* — Hunter B Lonsberry
*Assistant Examiner* — Harrison Heflin
(74) *Attorney, Agent, or Firm* — Oliff PLC

(57) ABSTRACT

A vehicle control system that sets a preliminary destination or a preliminary destination area toward which a vehicle heads in an autonomously driven state; that causes the vehicle to travel in the autonomously driven state to the preliminary destination or the preliminary destination area set by the preliminary destination/area setting section; that acquires position information for the vehicle; and that switches a driving state of the vehicle from the autonomously driven state to a manually driven state or a remotely operated driven state when the vehicle has been detected to have arrived at the preliminary destination or in the preliminary destination area based on the position information.

13 Claims, 13 Drawing Sheets

VEHICLE CONTROL SYSTEM, VEHICLE CONTROLLER DEVICE AND VEHICLE CONTROL METHOD

CROSS-REFERENCE TO RELATED APPLICATION

This application is based on and claims priority under 35 USC 119 from Japanese Patent Application No. 2019-135286 filed on Jul. 23, 2019, the disclosure of which is incorporated by reference herein.

BACKGROUND

Technical Field

The present disclosure relates to a vehicle control system, a vehicle controller device and a vehicle control method.

Related Art

For privacy protection reasons, it is desirable for the address of a delivery site or the like not to be known to a delivery agent.

A conceivable solution to issues such as driver shortages is to utilize autonomous driving or remotely operated driving for deliveries (for example, see the specification of U.S. Pat. No. 9,964,948).

When delivering by autonomous driving, the delivery agent (driver) does not go to the delivery site, offering superior privacy protection compared to cases in which the delivery agent delivers items directly.

However, there is still a need to input a delivery site address in the case of autonomous driving, which could result in the delivery site address being leaked to the delivery agent. There is therefore room for improvement in this respect.

SUMMARY

An aspect is a vehicle control system that includes: a preliminary destination/area setting section configured to set a preliminary destination or a preliminary destination area toward which a vehicle heads in an autonomously driven state; a travel control section configured to cause the vehicle to travel in the autonomously driven state to the preliminary destination or the preliminary destination area set by the preliminary destination/area setting section; a position information acquisition section configured to acquire position information for the vehicle; and a switchover section configured to switch a driving state of the vehicle from the autonomously driven state to a manually driven state or a remotely operated driven state when the vehicle has been detected to have arrived at the preliminary destination or in the preliminary destination area based on the position information.

DETAILED DESCRIPTION

Explanation follows regarding a vehicle control system according to an exemplary embodiment, with reference to FIG. 1 to FIG. 13.

Configuration

Figure 1:
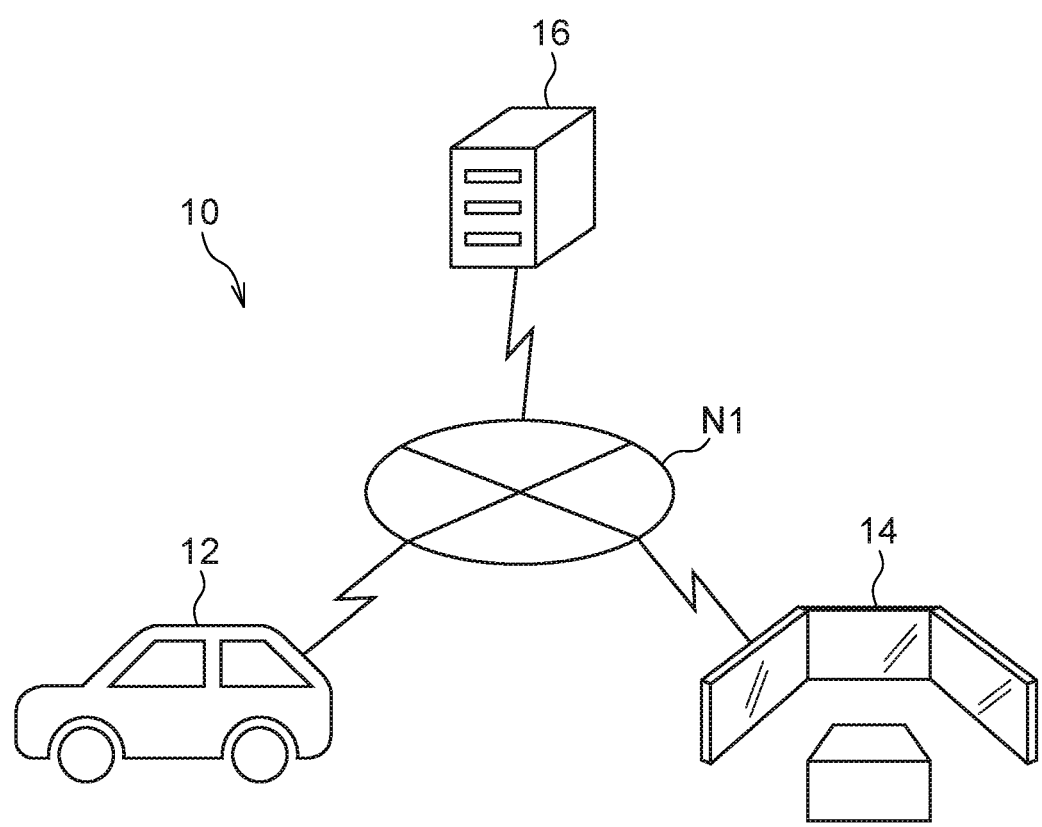
FIG. 1 is a schematic configuration diagram illustrating an example of an overall vehicle control system according to an exemplary embodiment.

As illustrated in FIG. 1, a vehicle control system 10 according to the present exemplary embodiment is configured including a vehicle 12, a remote operation device 14, and an information server 16.

The vehicle 12, the remote operation device 14, and the information server 16 of the present exemplary embodiment are connected to each other through a network N1.

The vehicle 12 is configured so as to be capable of executing autonomous driving in which self-driving is performed by a vehicle controller device 20 based on a pre-generated travel plan, remotely operated driving based on operation of the remote operation device 14 by a remote driver, and manual driving based on operation by an occupant of the vehicle 12 (namely, a driver).

Vehicle

Figure 2:
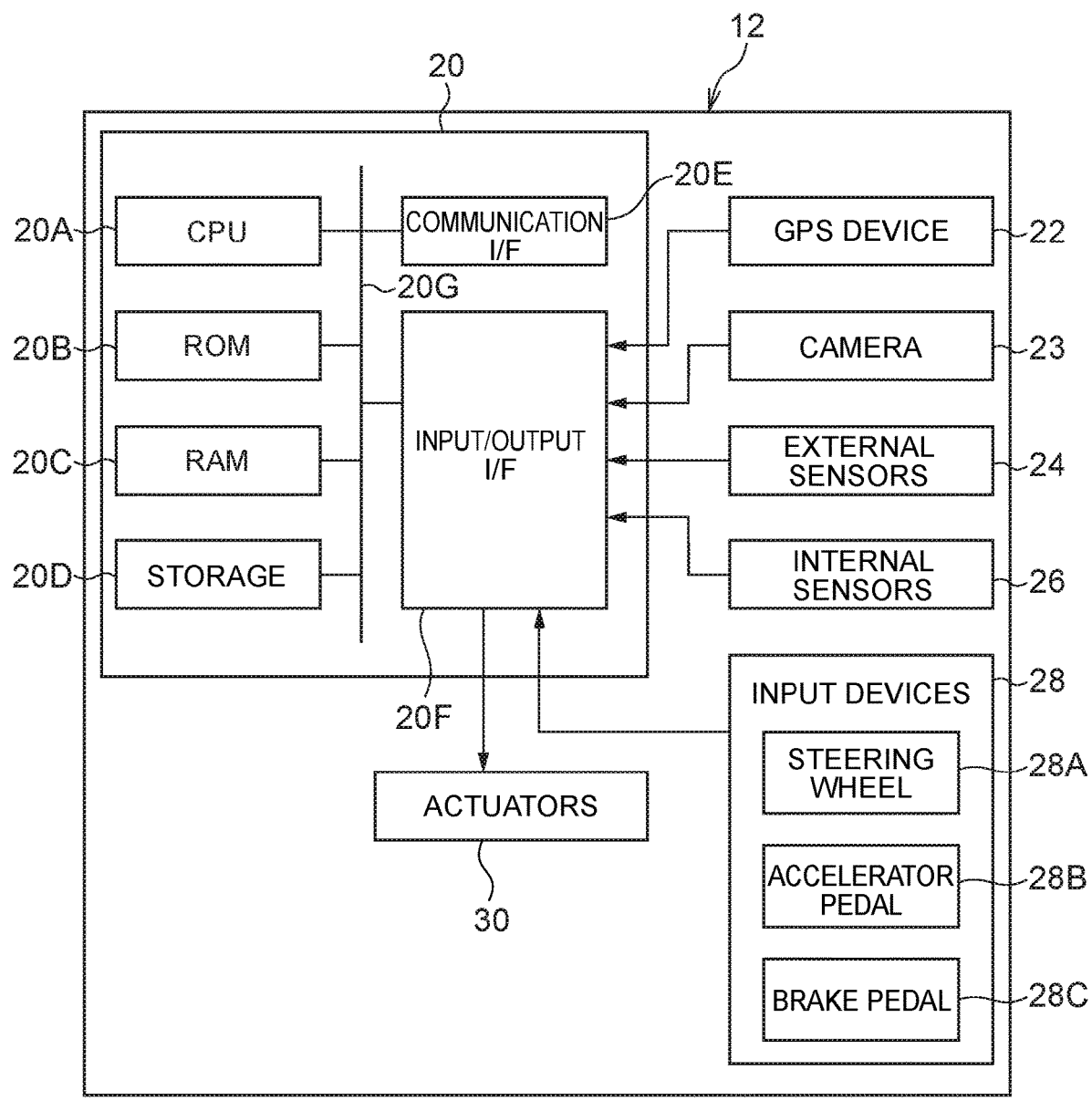
FIG. 2 is a block diagram illustrating an example of hardware configuration of a vehicle in a vehicle control system according to an exemplary embodiment.

FIG. 2 is a block diagram illustrating hardware configuration of equipment installed in the vehicle 12 of the present exemplary embodiment. The vehicle 12 includes a vehicle controller device 20, a global positioning system (GPS) device 22, a camera 23, external sensors 24 configured of external sensors other than the camera 23, internal sensors 26, input devices 28, and actuators 30.

The vehicle controller device 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E and the input/output I/F 20F are connected together so as to be capable of communicating with each other through a bus 20G.

The CPU 20A is a central processing unit that executes various programs and controls various sections. Namely, the CPU 20A reads a program from the ROM 20B and executes the program, using the RAM 20C as a workspace. In the present exemplary embodiment, an execution program is stored in the ROM 20B.

The ROM 20B illustrated in FIG. 2 stores various programs and various data. The RAM 20C serves as a workspace to temporarily store the programs or data.

The storage 20D is configured by a hard disk drive (HDD) or a solid state drive (SSD), and stores various programs including an operating system, as well as various data.

The communication I/F 20E includes an interface for connecting to the network N1 in order to communicate with a remote controller device 40, described later, the information server 16, and so on. A communication protocol such as Ethernet (registered trademark), FDDI, or Wi-Fi (registered trademark) is employed for this interface.

The communication I/F 20E of the present exemplary embodiment transmits a surroundings image captured by the camera 23 to the remote operation device 14 that is external to the vehicle 12, and receives remote operation information, this being operation information to operate the vehicle 12, from the remote operation device 14 through the network N1. The communication I/F 20E also receives delivery information (preliminary destination information or preliminary destination area information) from the information server 16 through the network N1.

The input/output I/F 20F is an interface for communicating with the various devices installed in the vehicle 12. The vehicle controller device 20 of the present exemplary embodiment is connected to the GPS device 22, the camera 23, the external sensors 24, the internal sensors 26, the input devices 28, and the actuators 30 through the input/output I/F 20F. Note that the GPS device 22, the camera 23, the external sensors 24, the internal sensors 26, the input devices 28, and the actuators 30 may be directly connected to the bus 20G.

The GPS device 22 is a device for measuring the current position of the vehicle 12. The GPS device 22 includes an antenna to receive signals from GPS satellites.

The camera 23 captures images of the vehicle 12 surroundings (hereafter referred to as surroundings images), including ahead of the vehicle 12.

The external sensors 24 are a group of sensors excluding the camera 23 that detect peripheral information regarding the surroundings of the vehicle 12. The external sensors 24 include millimeter-wave radar that transmits scanning waves over a predetermined range, and laser imaging detection and ranging (LIDAR) that scans a predetermined range.

The internal sensors 26 are a group of sensors that detect travel states of the vehicle 12. The internal sensors 26 include at least one out of a vehicle speed sensor, an acceleration sensor, and a yaw rate sensor.

The input devices 28 are a group of switches to be operated by the occupant on board the vehicle 12. The input devices 28 include a steering wheel 28A serving as a switch to steer the steered wheels of the vehicle 12, an accelerator pedal 28B serving as a switch to cause the vehicle 12 to accelerate, and a brake pedal 28C serving as a switch to cause the vehicle 12 to decelerate.

The actuators 30 include a steering wheel actuator to drive the steered wheels of the vehicle 12, an accelerator actuator to control acceleration of the vehicle 12, and a brake actuator to control deceleration of the vehicle 12.

Figure 3:
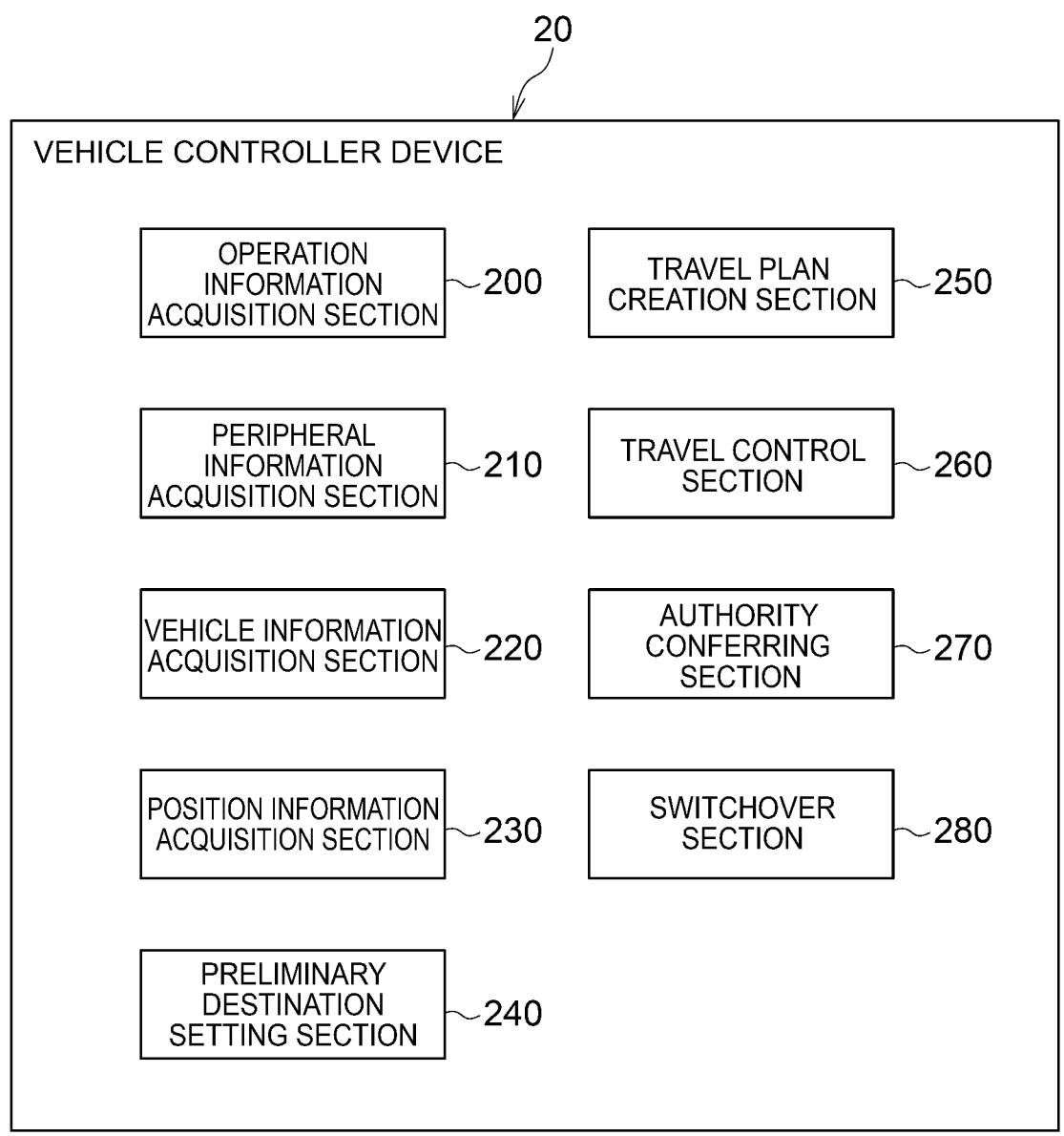
FIG. 3 is a block diagram illustrating an example of functional configuration of a vehicle controller device according to an exemplary embodiment.

FIG. 3 is a block diagram illustrating an example of functional configuration of the vehicle controller device 20. As illustrated in FIG. 3, the vehicle controller device 20 includes an operation information acquisition section 200, a peripheral information acquisition section 210, a vehicle information acquisition section 220, a position information acquisition section 230, a preliminary destination/area setting section 240, a travel plan creation section 250, a travel control section 260, an authority conferring section 270, and a switchover section 280. Each of the functional configurations is implemented by the CPU 20A reading the execution program stored in the ROM 20B and executing this program.

During manual driving of the vehicle 12, the operation information acquisition section 200 acquires operation amounts of the steering wheel 28A, the accelerator pedal 28B, and the brake pedal 28C by the occupant (driver) from the input devices 28 through the input/output I/F 20F.

The peripheral information acquisition section 210 includes functionality to acquire peripheral information regarding the periphery of the vehicle 12. The peripheral information acquisition section 210 acquires the surroundings images of the vehicle 12 captured by the camera 23 and peripheral information from the external sensors 24 regarding the vehicle 12 through the input/output I/F 20F. The "peripheral information" includes not only information regarding vehicles and pedestrians in the surroundings of the vehicle 12, but also regarding the weather, brightness, road width, obstacles, and so on.

The vehicle information acquisition section 220 includes functionality to acquire vehicle information such as the vehicle speed, acceleration, yaw rate, and so on of the vehicle 12. The vehicle information acquisition section 220 acquires the vehicle information regarding the vehicle 12 from the internal sensors 26 through the input/output I/F 20F.

The position information acquisition section 230 includes functionality to acquire the current position of the vehicle 12. The position information acquisition section 230 acquires position information from the GPS device 22 through the input/output I/F 20F.

The preliminary destination/area setting section 240 acquires preliminary destination information or preliminary destination area information associated with a parcel from the delivery information transmitted from the information server 16, and sets the preliminary destination or preliminary destination area, which the vehicle 12 then heads toward in the autonomously driven state.

The travel plan creation section 250 includes functionality to generate a travel plan to cause the vehicle 12 to travel based on the position information acquired by the position information acquisition section 230, the peripheral information acquired by the peripheral information acquisition section 210, and the vehicle information acquired by the vehicle information acquisition section 220. The travel plan includes not only a travel route set in consideration of the set preliminary destination information or preliminary destination area information associated with the parcel, but also information regarding a course to avoid obstacles ahead of the vehicle 12, the speed of the vehicle 12, and so on.

The travel control section 260 includes functionality to control autonomous driving based on the travel plan generated by the travel plan creation section 250, remotely operated driving based on the remote operation information received from the remote operation device 14, and manual driving based on the vehicle operation information received by the operation information acquisition section 200.

The authority conferring section 270 includes functionality to confer operational authority, this being authority to operate the vehicle 12 installed with the vehicle controller device 20, to a remote driver, this being a parcel recipient or other related party who is to operate the remote operation device 14. In cases in which operational authority has been conferred to a remote driver, the vehicle controller device 20 transmits an authority transfer command to the remote operation device 14 being operated by the remote driver. Transmission of the authority transfer command may be performed at the same time as notification of arrival at the preliminary destination or within the preliminary destination area, or may be performed after the notification of arrival.

The switchover section 280 switches the driving states of the vehicle 12 between the autonomously driven state, the remotely operated driven state, and the manually driven state. In the present exemplary embodiment, the vehicle 12 is switched from the autonomously driven state to the remotely operated driven state when a preparation complete command is received from the remote controller device 40 after transmitting an authority transfer command to the remote controller device 40. Alternatively, the vehicle 12 is switched from the remotely operated driven state to the autonomously driven state when a preparation complete command is received from the remote controller device 40 after transmitting an authority transfer command to the remote controller device 40.

Note that by transferring operational authority from the vehicle 12 to the remote operation device 14, the vehicle 12 travels based on remote operation information received from the remote operation device 14. Namely, remotely operated driving of the vehicle 12 is performed by the remote driver.

Remote Operation Device

Figure 4:
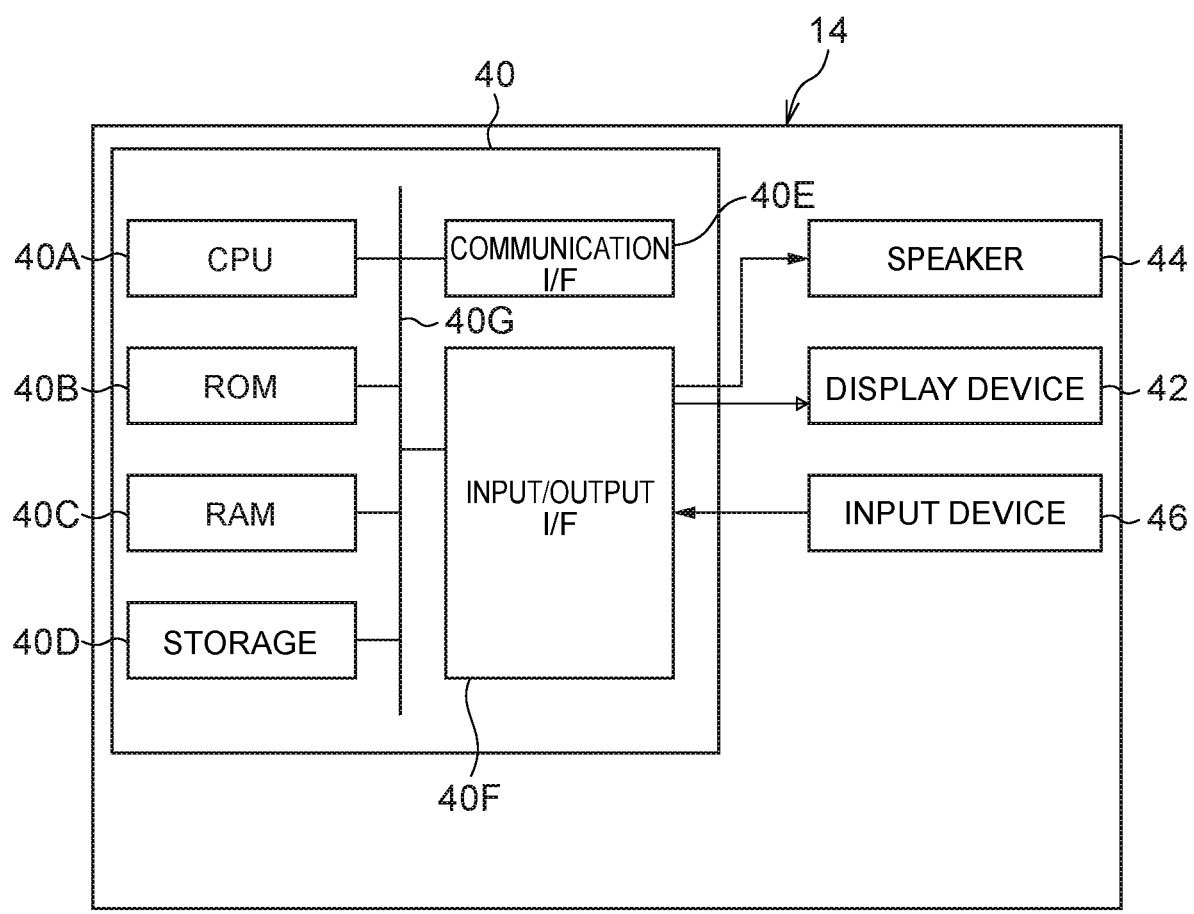
FIG. 4 is a block diagram illustrating an example of hardware configuration of a remote operation device in a vehicle control system according to an exemplary embodiment.

FIG. 4 is a block diagram illustrating hardware configuration of equipment installed in the remote operation device 14 of the present exemplary embodiment. The remote operation device 14 includes the remote controller device 40, a display device 42, a speaker 44, and an input device 46.

The remote controller device 40 is configured including a CPU 40A, ROM 40B, RAM 40C, storage 40D, a communication I/F 40E and an input/output I/F 40F. The CPU 40A, the ROM 40B, the RAM 40C, the storage 40D, the communication I/F 40E, and the input/output I/F 40F are connected together so as to be capable of communicating with each other through a bus 40G Functionality of the CPU 40A, the ROM 40B, the RAM 40C, the storage 40D, the communication I/F 40E, and the input/output I/F 40F matches that of the CPU 20A, the ROM 20B, the RAM 20C, the storage 20D, the communication I/F 20E, and the input/output I/F 20F of the vehicle controller device 20 previously described.

Figure 5:
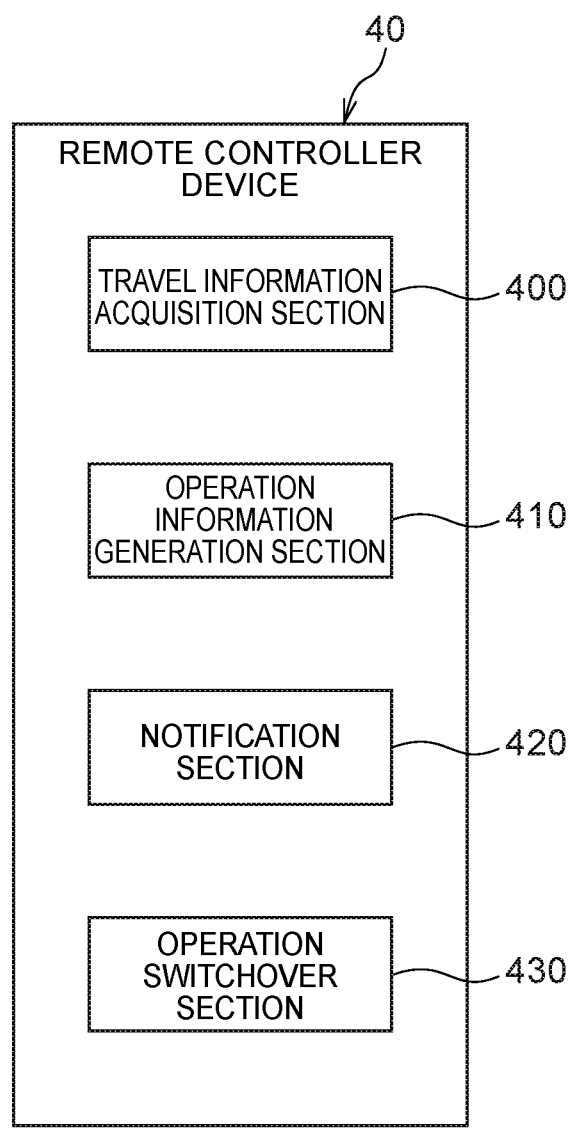
FIG. 5 is a block diagram illustrating an example of functional configuration of a remote controller device according to an exemplary embodiment.

The CPU 40A reads a program from the ROM 40B and executes the program, using the RAM 40C as a workspace. In the present exemplary embodiment, a processing program is stored in the ROM 40B. When the CPU 40A executes the processing program, the remote controller device 40 functions as a travel information acquisition section 400, an operation information generation section 410, a notification section 420, and an operation switchover section 430 as illustrated in FIG. 5.

As illustrated in FIG. 4, the display device 42, the speaker 44, and the input device 46 are connected to the remote controller device 40 of the present exemplary embodiment through the input/output I/F 40F. Note that the display device 42, the speaker 44, and the input device 46 may be directly connected to the bus 40G.

The display device 42 is a liquid crystal monitor for displaying a surroundings image captured by the camera 23 of the vehicle 12 and various information relating to the vehicle 12.

The speaker 44 is a speaker for sounding an alarm to notify that the vehicle 12 has arrived at the preliminary destination or in the preliminary destination area, and for replaying audio recorded by a microphone attached to the camera 23 of the vehicle 12 together with the surroundings image.

The input device 46 is a controller operated by the remote driver using the remote operation device 14. The input device 46 is for example a video game controller connected to the network N1, and is used to steer the steered wheels of the vehicle 12 and cause the vehicle 12 to accelerate. Note that the implementation of the input device 46 is not limited thereto.

For example, the display device 42 and the speaker 44 of the remote operation device 14 may be a liquid crystal monitor screen and a speaker of a smartphone, and the input device 46 may be a pressure sensor or acceleration sensor provided to the liquid crystal monitor. In such cases, the acceleration or deceleration of the vehicle 12 may conceivably be adjusted by changing the force of pressure against the liquid crystal monitor, and the steering amount of the vehicle 12 may conceivably be adjusted by rotating the smartphone itself.

FIG. 5 is a block diagram illustrating an example of functional configuration of the remote controller device 40. As illustrated in FIG. 5, the remote controller device 40 includes the travel information acquisition section 400, the operation information generation section 410, the notification section 420, and the operation switchover section 430.

The travel information acquisition section 400 includes functionality to acquire audio as well as the surroundings images from the camera 23, and vehicle information such as the vehicle speed, that are transmitted by the vehicle controller device 20. The acquired surroundings image and vehicle information are displayed on the display device 42 and the audio information is output through the speaker 44.

The operation information generation section 410 includes functionality to receive signals output from the input device 46 when remotely operated driving is being performed by the remote driver. The operation information generation section 410 also generates remote operation information to be transmitted to the vehicle controller device 20 based on the signals received from the input device 46.

The notification section 420 outputs an alarm signal to the speaker 44 on receiving an arrival notification signal from the vehicle controller device 20. An alarm is thereby sounded through the speaker 44 so as to notify the remote driver that the vehicle 12 has arrived at the preliminary destination or in the preliminary destination area. Namely, the remote driver is prompted to prepare for remotely operated driving.

The operation switchover section 430 includes functionality to execute switching of the vehicle controller device 20 from the autonomously driven state to the remotely operated driven state. When the remote driver operates an operation section of the remote operation device 14 to perform remotely operated driving, a preparation complete command is output to the vehicle controller device 20. For example, when information relating to operational authority has already been received from the vehicle controller device 20 of the vehicle 12, the operation switchover section 430 outputs a preparation complete command to the vehicle controller device 20 so as to switch the vehicle 12 from the autonomously driven state to the remotely operated driven state.

Information Server

Figure 6:
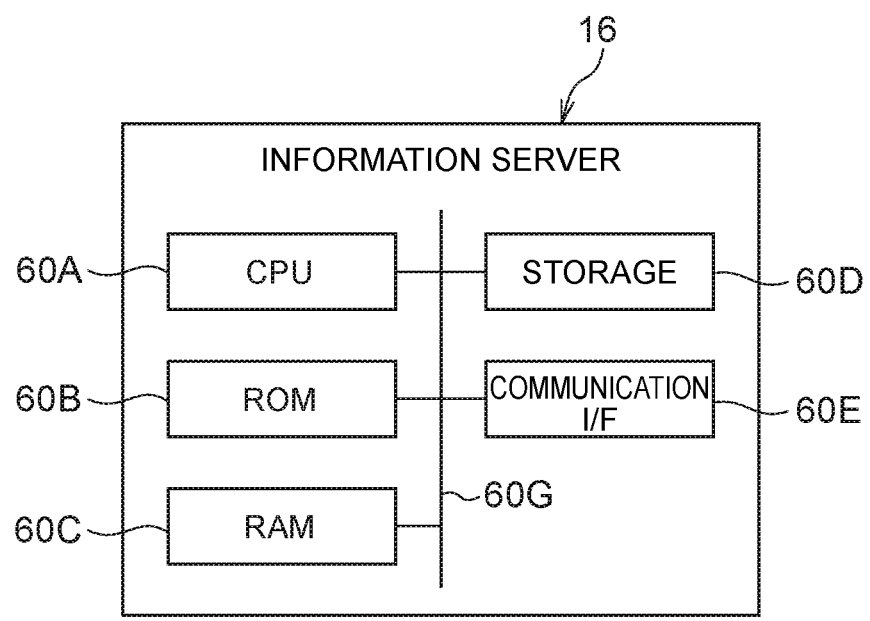
FIG. 6 is a block diagram illustrating an example of hardware configuration of an information server in a vehicle control system according to an exemplary embodiment.

As illustrated in FIG. 6, the information server 16 is configured including a CPU 60A, ROM 60B, RAM 60C, storage 60D, and a communication I/F 60E. The CPU 60A, the ROM 60B, the RAM 60C, the storage 60D, and the communication I/F 60E are connected together so as to be capable of communicating with each other through a bus 60G Functionality of the CPU 60A, the ROM 60B, the RAM 60C, the storage 60D, and the communication I/F 60E matches that of the CPU 20A, the ROM 20B, the RAM 20C, the storage 20D, and the communication I/F 20E of the vehicle controller device 20 previously described.

The CPU 60A reads a program from the ROM 60B or the storage 60D and executes the program, using the RAM 60C as a workspace. In the present exemplary embodiment, an information processing program is stored in the storage 60D. By executing the information processing program, the CPU 60A functions as a delivery order information acquisition section 600, a preliminary destination/area setting prompt section 610, a delivery information generation section 620, a delivery information transmission section 630, and an unsuccessful delivery information transmission section 640 as illustrated in FIG. 7.

Figure 7:
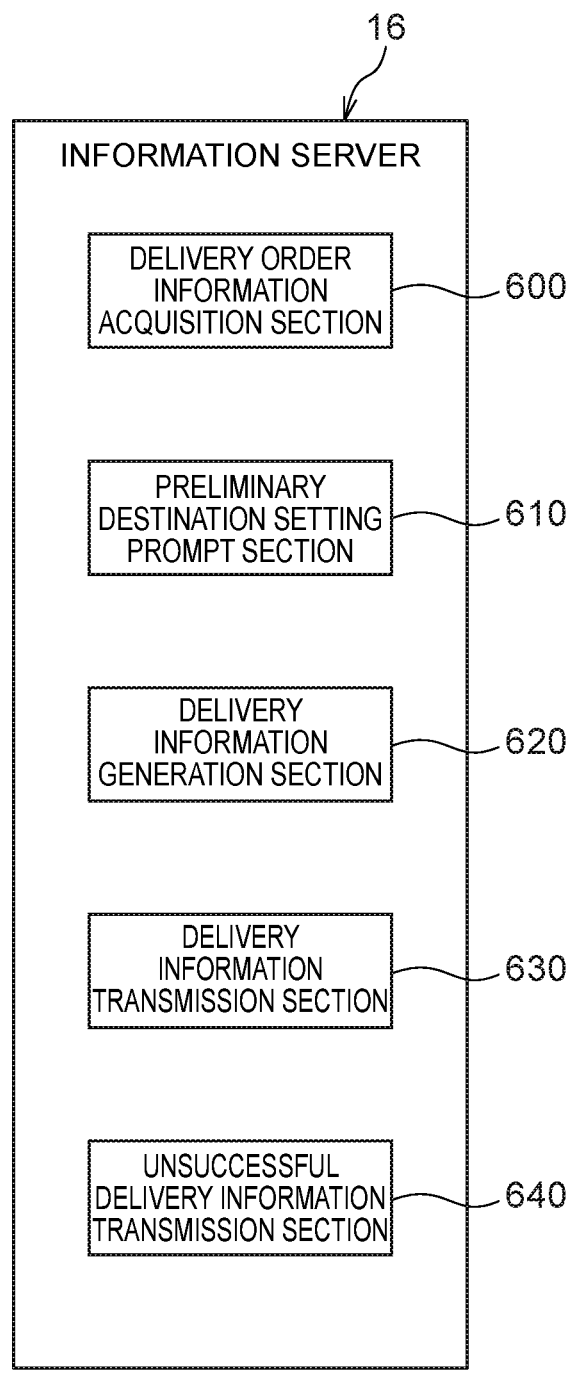
FIG. 7 is a block diagram illustrating an example of functional configuration of an information server according to an exemplary embodiment.

FIG. 7 is a block diagram illustrating an example of functional configuration of the information server 16. As illustrated in FIG. 7, the information server 16 includes the delivery order information acquisition section 600, the preliminary destination/area setting prompt section 610, the delivery information generation section 620, the delivery information transmission section 630, and the unsuccessful delivery information transmission section 640.

The delivery order information acquisition section 600 acquires delivery order information based on electronic information input when a parcel is accepted for delivery. The delivery order information includes the name, address, and email address of the sender, the name, the preliminary destination or preliminary destination area (hereafter sometimes simply referred to as the preliminary destination/area), and the email address of the recipient, the type of parcel, and so on.

The preliminary destination/area setting prompt section 610 includes functionality to determine that the recipient wishes to set a preliminary destination or preliminary destination area in cases in which the preliminary destination/area has not been set in the delivery order information, and functionality to send a setting prompt email prompting setting of the preliminary destination or preliminary destination area to the email address of the recipient pre-registered in the delivery order information.

Note that the preliminary destination or preliminary destination area refers to a specific site or a locality from which the recipient performs remotely operated driving to the location (such as the home) of the recipient, this being the delivery site, after the autonomously driven (delivery) vehicle 12 has arrived at the preliminary destination or preliminary destination area.

For example, a park close to the home of the recipient may be set as a preliminary destination, or a town including the home of the recipient may be set as a preliminary destination area. In the case of a preliminary destination area, the vehicle 12 is directly switched from the autonomously driven state to the remotely operated driven state when the vehicle 12 arrives at the boundary of the preliminary destination area.

The delivery information generation section 620 reads the preliminary destination or the preliminary destination area set in the delivery order information, and generates delivery information in which the preliminary destination information or preliminary destination area information is associated with the parcel.

The delivery information transmission section 630 transmits the delivery information to the vehicle 12 that is to deliver the parcel.

In cases in which the recipient does not set a preliminary destination/area within a predetermined duration after sending the setting prompt email, the unsuccessful delivery information transmission section 640 sends an unsuccessful delivery email to the sender.

Operation

Explanation follows regarding operation of the vehicle control system 10 according to the present exemplary embodiment.

First, a brief explanation follows regarding cases in which manual driving, autonomous driving, and remotely operated driving of the vehicle 12 are performed by the vehicle control system 10. Explanation is then given regarding a case in which the vehicle control system 10 is applied to a delivery system.

First, a brief explanation follows regarding cases in which manual driving, autonomous driving, and remotely operated driving of the vehicle 12 are performed.

In cases in which manual driving has been selected for the vehicle 12, operation amounts such as a depression amount of the accelerator pedal, a depression amount of the brake pedal, and a rotation amount of the steering wheel by the occupant (driver) are acquired by the operation information acquisition section 200 of the vehicle controller device 20, and these operation amounts are output to the travel control section 260. The travel control section 260 of the vehicle controller device 20 transmits control signals to the actuators 30 based on these operation amounts, such that travel of the vehicle 12 is manually driven.

In cases in which autonomous driving has been selected for the vehicle 12, the travel plan creation section 250 creates a travel plan based on the preliminary destination information or preliminary destination area information acquired by the preliminary destination/area setting section 240, the surroundings information from the camera 23 and the external sensors 24, the position information acquired by the position information acquisition section 230, and so on. The vehicle 12 travels to the preliminary destination or preliminary destination area by being autonomously driven based on the created travel plan.

In cases in which remotely operated driving has been selected for the vehicle 12, the remote driver at the remote operation device 14 operates the input device 46 while viewing the surroundings images captured by the camera 23 of the vehicle 12. An operation information signal according to the operation amounts is generated by the operation information generation section 410 of the remote operation device 14, and this signal is transmitted to the vehicle controller device 20. The travel control section 260 of the vehicle controller device 20 transmits control signals to the actuators 30 based on this information, such that travel of the vehicle 12 is driven by remote operation.

Next, explanation follows regarding a case in which the vehicle control system 10 is applied to a delivery system in which the vehicle 12 is autonomously driven to a preliminary destination or preliminary destination area near to a parcel delivery site (such as a home), and the vehicle 12 is then caused to travel from the preliminary destination or within the preliminary destination area to the home by remotely operated driving by the recipient or a related party (hereafter sometimes referred to as the recipient/related party).

Figure 8:
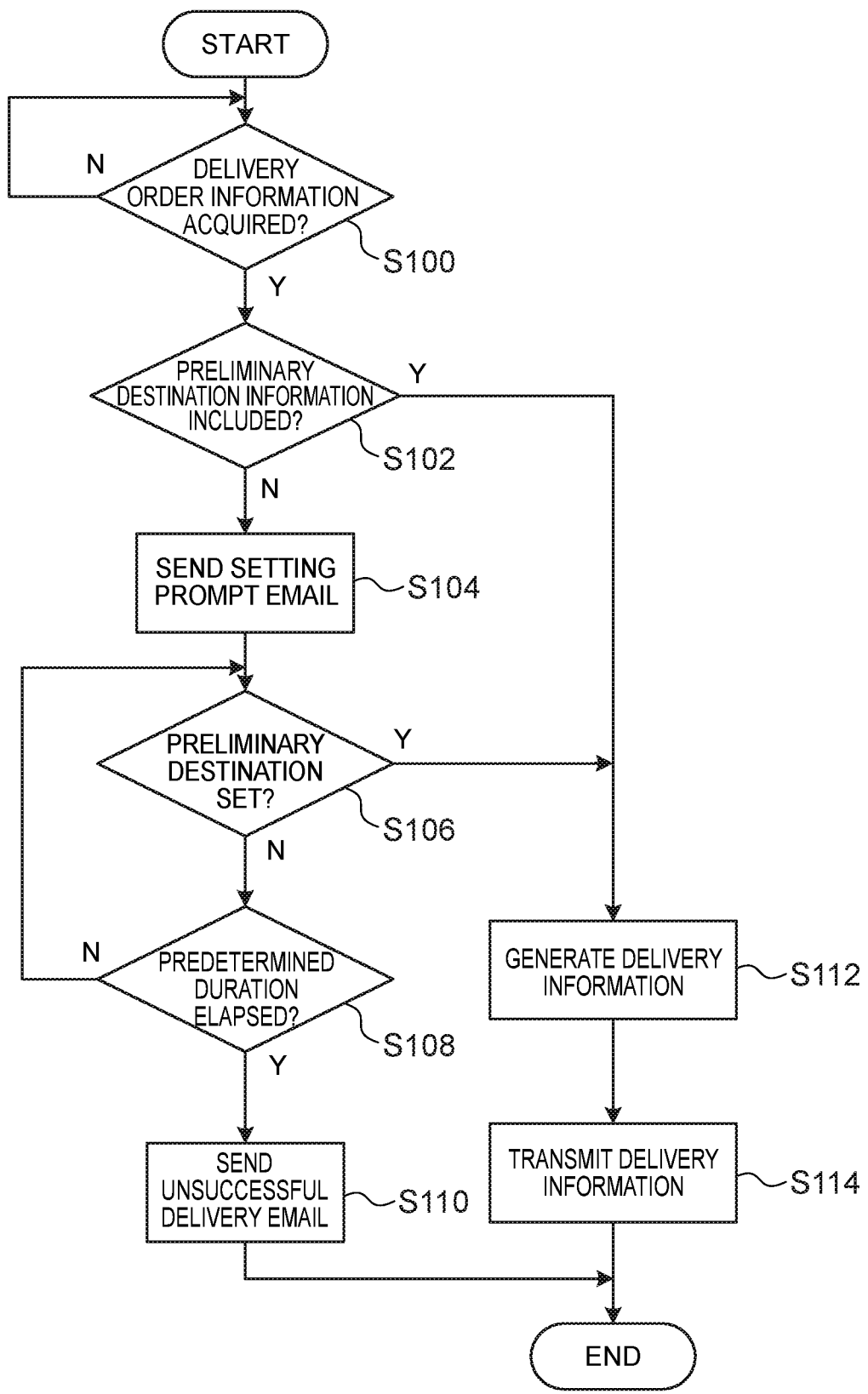
FIG. 8 is a flowchart illustrating an example of delivery order control by an information server according to an exemplary embodiment.

As illustrated in FIG. 8, when the CPU 60A acquires the delivery order information (YES at step S100), the information server 16 determines whether or not a preliminary destination/area has been set in the delivery order information (step S102).

Note that in cases in which delivery order information has not been acquired (NO at step S100), the processing stands by until acquisition thereof.

In cases in which a preliminary destination/area has not been set in the delivery order information (NO at step S102), the CPU 60A sends a setting prompt email to the email address registered for the recipient so as to prompt the recipient to set a preliminary destination or preliminary destination area in the delivery order information (step S104). This is since determination is made that the recipient wishes to set the preliminary destination or preliminary destination area themselves in cases in which the preliminary destination/area is not included in the delivery order information, and so the recipient is prompted to set the preliminary destination or preliminary destination area.

The CPU 60A then determines whether or not the preliminary destination or preliminary destination area has been set in the delivery order information by the recipient (step S106).

In cases in which a preliminary destination or preliminary destination area has not been set in the delivery order information (NO at step S106), the CPU 60A determines whether or not a predetermined duration has elapsed since the setting prompt email was sent (step S108).

The CPU 60A repeats the processing of step S106 onward until the predetermined duration has elapsed since the setting prompt email was sent (when NO at step S108).

In cases in which the predetermined duration has elapsed since the setting prompt email was sent but the preliminary destination or preliminary destination area has not been set in the delivery order information (YES at step S108), the CPU 60A sends an unsuccessful delivery email to the email address of the sender to say that delivery was unsuccessful (step S110), and ends the processing.

In cases in which the preliminary destination/area has been set in the delivery order information (YES at step S102), or the preliminary destination/area is set in the delivery order information within the predetermined duration after the setting prompt email was sent (YES at step S106), delivery information is generated in which the preliminary destination information or the preliminary destination area information is associated with the parcel (step S112), and the delivery information is transmitted to the vehicle controller device 20 of the vehicle 12 that is to deliver the parcel (step S114).

Figure 9:
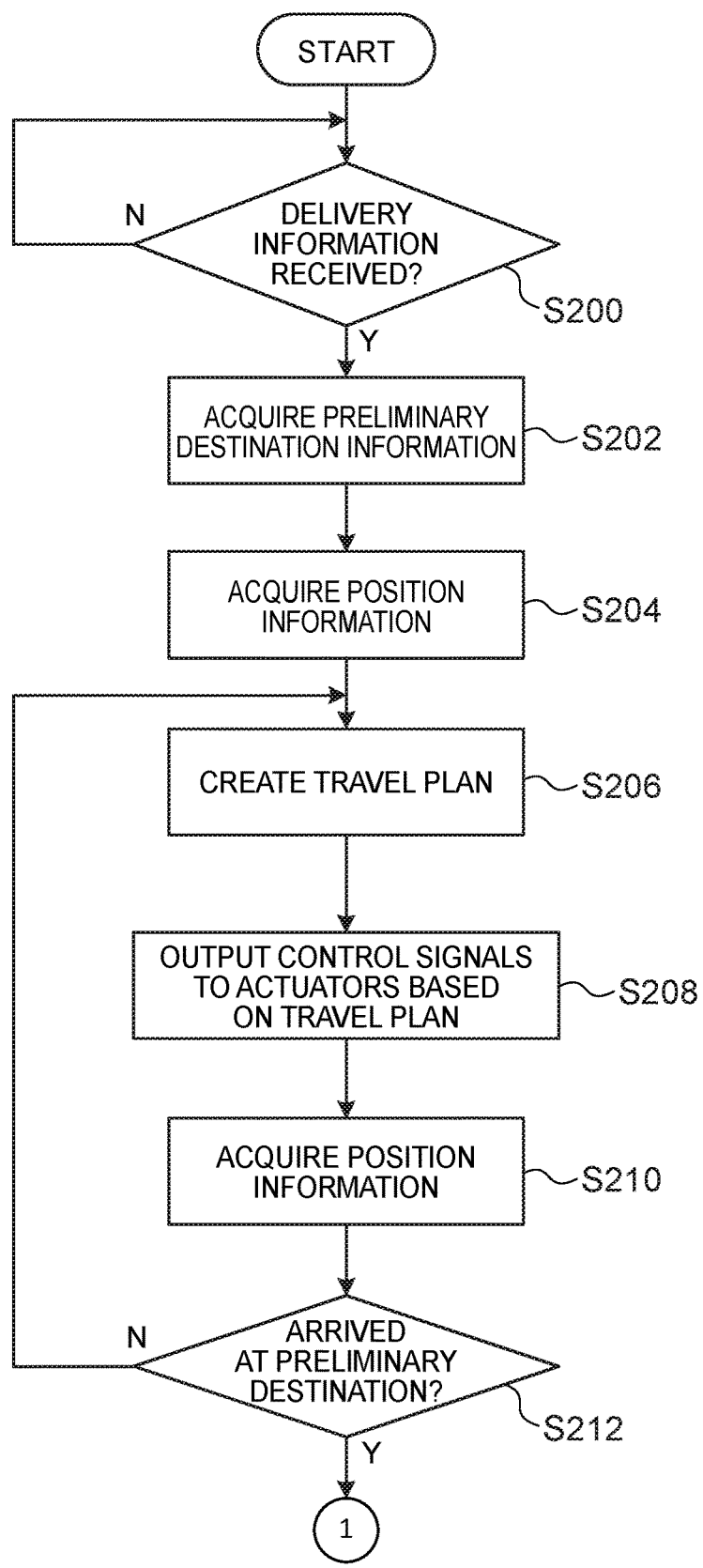
FIG. 9 is a flowchart illustrating an example of delivery control by a vehicle according to an exemplary embodiment.
Figure 10:
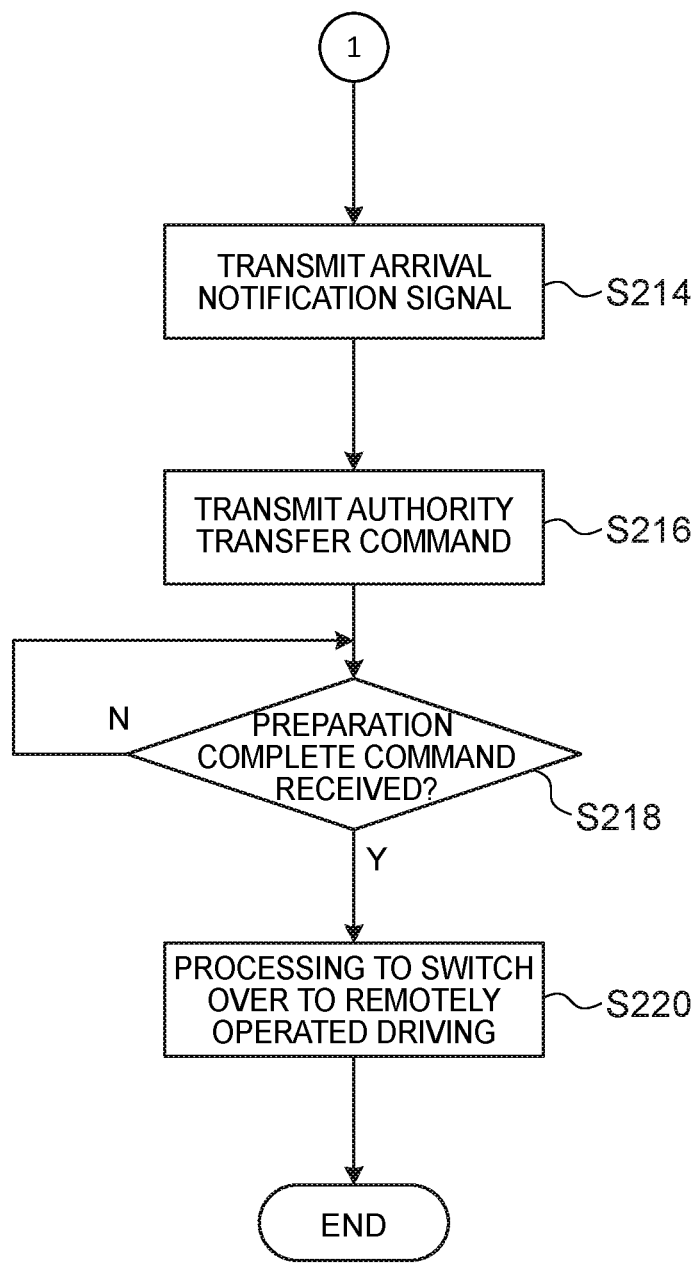
FIG. 10 is a flowchart illustrating an example of delivery control by a vehicle according to an exemplary embodiment.

Explanation follows regarding the vehicle 12 to which the delivery information is transmitted in the above manner, with reference to FIG. 9 and FIG. 10.

When delivery information has been received from the information server 16 (YES at step S200), the CPU 20A of the vehicle controller device 20 acquires the preliminary destination information or preliminary destination area information from the delivery information (step S202). The preliminary destination is a place where the vehicle 12 is switched from the autonomously driven state to the remotely operated driven state or the manually driven state. The preliminary destination area is a locality within which the vehicle 12 is switched from the autonomously driven state to the remotely operated driven state or the manually driven state when the vehicle 12 has arrived in the preliminary destination area. In the present exemplary embodiment, explanation follows regarding a case in which the vehicle 12 is switched to the remotely operated driven state.

Note that in cases in which the delivery information has not been acquired (NO at step S200) the CPU 20A stands by until acquisition thereof.

Next, the CPU 20A acquires position information for the current location of the vehicle 12 (step S204).

The CPU 20A then creates a travel plan based on the preliminary destination or preliminary destination area, the current position information for the vehicle 12, and so on (step S206).

The CPU 20A then outputs control signals to the actuators 30 based on the travel plan (step S208). The vehicle 12 is thereby autonomously driven toward the preliminary destination or preliminary destination area.

After a predetermined duration has elapsed, the CPU 20A again acquires position information for the current location of the vehicle 12 (step S210).

Next, the CPU 20A determines whether or not the vehicle 12 has arrived at the preliminary destination/area based on the acquired current position of the vehicle 12 (step S212). Note that in the case of a preliminary destination area, the CPU 20A determines whether or not the vehicle 12 has arrived within the preliminary destination area.

In cases in which the vehicle 12 has not arrived at the preliminary destination/area (NO at step S212), the CPU 20A repeats the processing of step S206 onward.

As illustrated in FIG. 10, when the vehicle 12 has arrived at the preliminary destination/area (YES at step S212), the CPU 20A transmits an arrival notification signal to the remote controller device 40 in order to notify the recipient that the vehicle 12 has arrived at the preliminary destination or in the preliminary destination area (step S214).

Next, the CPU 20A transmits an authority transfer command to the remote controller device 40 (step S216).

The CPU 20A then determines whether or not a preparation complete command, described later, transmitted from the remote controller device 40 has been received (step S218).

In cases in which a preparation complete command has been received from the remote controller device 40 (YES at step S218), the CPU 20A switches the vehicle 12 from the autonomously driven state to the remotely operated driven state (step S220). Namely, the vehicle 12 is set to a state capable of traveling based on remote operation information from the remote controller device 40.

Note that in cases in which a preparation complete command has not been received (NO at step S218), processing stands by until receipt thereof.

Next, explanation follows regarding the remote operation device 14 when starting remote operation in response to the signals from the vehicle controller device 20 described above.

Figure 11:
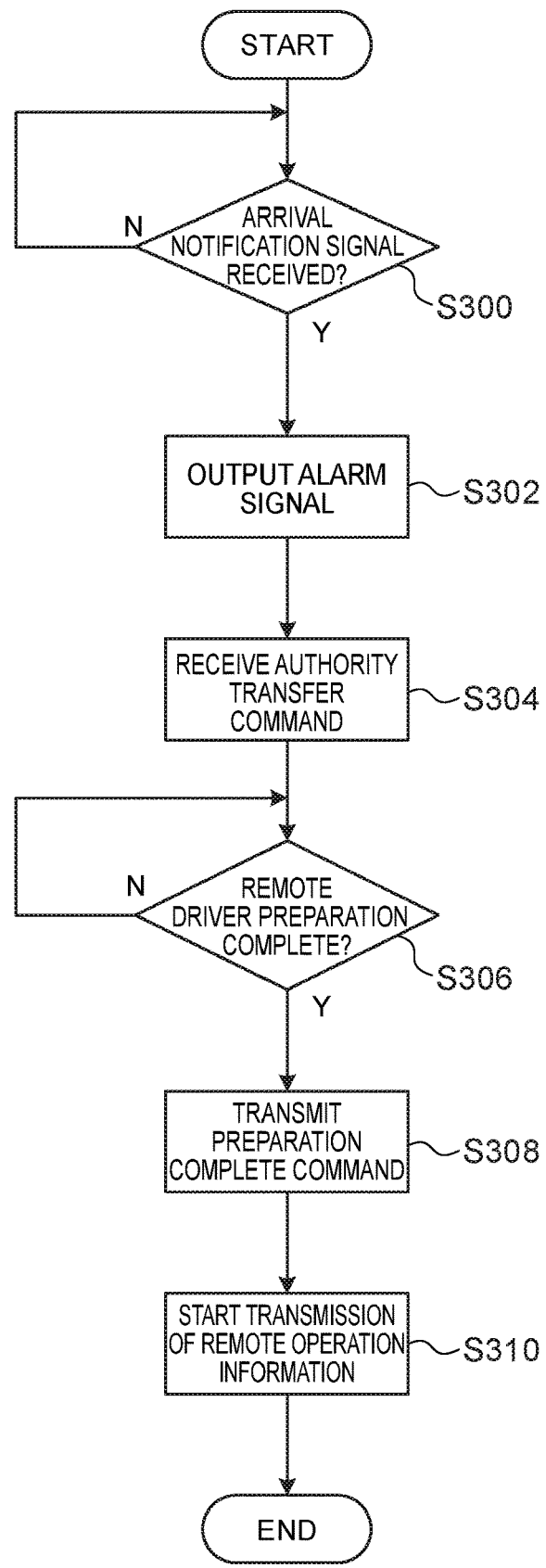
FIG. 11 is a flowchart illustrating an example of driving state switchover control by a remote operation device according to an exemplary embodiment.

As illustrated in FIG. 11, the CPU 40A of the remote controller device 40 determines whether or not an arrival notification signal has been received from the vehicle 12 (step S300).

When the arrival notification signal has been received (YES at step S300), the CPU 40A generates an alarm signal that it outputs to the speaker 44 (step S302). An alarm is thereby sounded through the speaker 44 to notify the recipient/related party that the vehicle 12 has arrived at the preliminary destination or in the preliminary destination area and that remote operation is required.

Note that in cases in which the arrival notification signal has not been received (NO at step S300), the CPU 40A stands by.

Next, the CPU 40A receives the authority transfer command from the vehicle 12 (step S304).

Next, the CPU 40A checks whether or not the remote driver, this being the parcel recipient or related party, is in a state capable of remotely operated driving (step S306). The remote driver operates a switch or the like on the remote operation device 14 to input that they are in a state capable of remote operation, and the CPU 40A thereby determines that the remote driver is capable of remotely operated driving.

In cases in which the remote driver is determined to be capable of remotely operated driving (YES at step S306), the CPU 40A transmits a preparation complete command to the vehicle controller device 20 (step S308). On receipt of the preparation complete command, the vehicle controller device 20 switches the vehicle 12 from the autonomously driven state to the remotely operated driven state, thereby enabling the vehicle 12 to be driven by remote operation from the remote operation device 14.

Next, the CPU 40A starts transmission of remote operation information to the vehicle controller device 20 (step S310). Specifically, the CPU 40A acquires signals from the input device 46 in response to operation by the remote driver, and transmits remote operation information generated based on the acquired signals to the vehicle controller device 20. Remotely operated driving of the vehicle 12 is executed in this manner. Processing by the CPU 40A to take over operation is thus completed.

In this manner, a remote driver such as the recipient operates the remote operation device 14 for which remotely operated driving has been enabled, and the vehicle 12 is thereby caused to travel by remotely operated driving to the location of the recipient, such as their home, where the recipient takes possession of the parcel.

Then, after the remote driver has caused the vehicle 12 to travel to a position away from the location of the recipient by remotely operated driving, remotely operated driving end processing is performed.

Processing by the remote controller device 40 and processing by the vehicle controller device 20 to perform this remotely operated driving end processing are explained with reference to FIG. 12 and FIG. 13 respectively.

Figure 12:
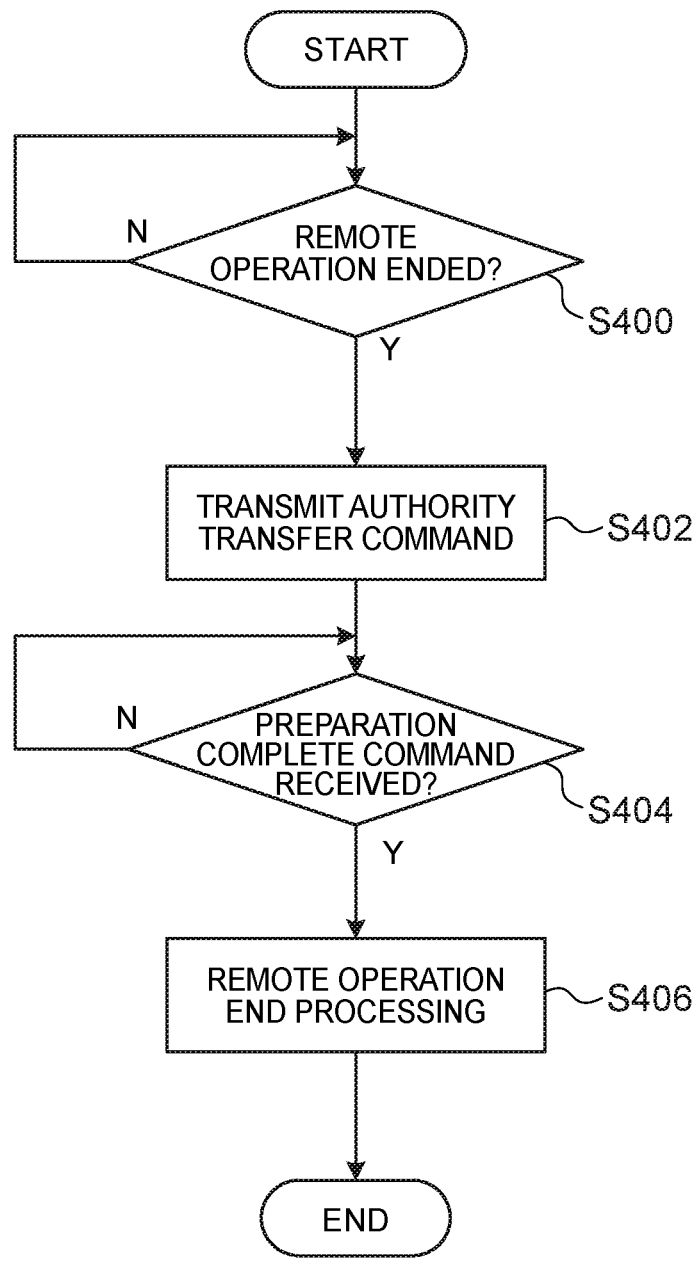
FIG. 12 is a flowchart illustrating an example of remotely operated driving end processing by a remote operation device according to an exemplary embodiment.

As illustrated in FIG. 12, the CPU 40A of the remote controller device 40 determines whether or not the remote operation has ended (step S400). Specifically, the CPU 40A determines that the remote operation has ended in response to an input such as operation of a switch or the like on the remote operation device 14 by the remote driver.

In cases in which the remote operation has not ended (NO at step S400), the CPU 40A stands by.

In cases in which the remote operation has ended (YES at step S400), the CPU 40A transmits an authority transfer command to the vehicle controller device 20 (step S402).

Next, the CPU 40A determines whether or not a preparation complete command has been received from the vehicle controller device 20 (step S404).

In cases in which the preparation complete command has not been received (NO at step S404), the CPU 40A stands by until receipt thereof.

In cases in which the preparation complete command has been received (YES at step S404), the CPU 40A performs the remote operation end processing (step S406), and ends the processing. The CPU 40A performs processing such as disabling operational input to the input device 46 of the remote operation device 14.

Figure 13:
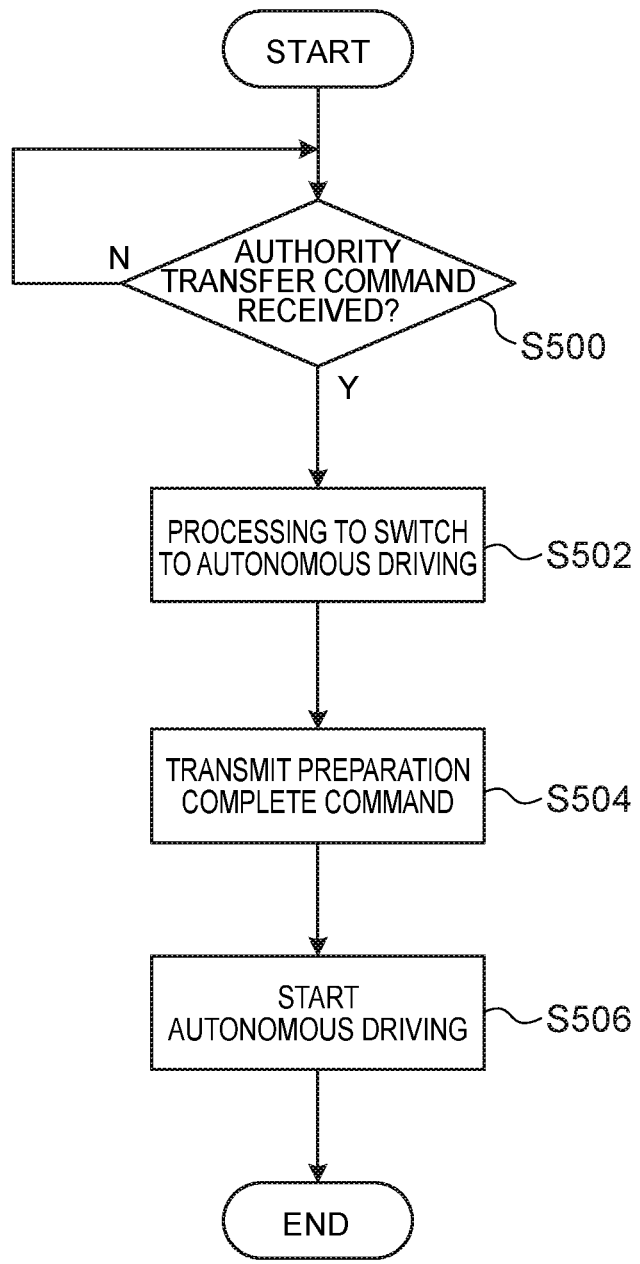
FIG. 13 is a flowchart illustrating an example of processing to return to an autonomously driven state by a vehicle according to an exemplary embodiment.

Meanwhile, the vehicle controller device 20 performs the following processing, as illustrated in FIG. 13.

The CPU 20A determines whether or not the authority transfer command has been received from the remote controller device 40 (step S500).

In cases in which the authority transfer command has not been received from the remote controller device 40 (NO at step S500), the CPU 20A stands by.

In cases in which the authority transfer command has been received from the remote controller device 40 (YES at step S500), the CPU 20A switches the vehicle 12 from the remotely operated driven state to the autonomously driven state (step S502).

Next, the CPU 20A transmits the preparation complete command to the remote controller device 40 (step S504).

The CPU 20A then starts autonomous driving of the vehicle 12 (step S506). In cases in which there is a subsequent preliminary destination/area, a travel plan is created based on the travel route to this preliminary destination/area and so on, and control signals are output to the actuators 30 based on the travel plan so as to cause the vehicle 12 to travel by autonomous driving. Note that in cases in which there is no subsequent preliminary destination/area, the vehicle 12 is autonomously driven back to the depot.

In this manner, in the vehicle control system 10 according to the present exemplary embodiment the vehicle 12 delivering the parcel is autonomously driven to the preliminary destination/area that is not a pre-set delivery site, and the recipient/related party then causes the vehicle 12 to travel by remotely operated driving from the preliminary destination/ area to the delivery site (i.e. the location of the parcel recipient (such as their home)). Namely, delivering the parcel using the vehicle control system 10 eliminates the risk of the location (address) of the recipient becoming known to the delivery company, and thus offers superior privacy protection.

In the vehicle control system 10, remotely operated driving does not end when the parcel is taken into the possession of the recipient, and the end timing can be decided by the remote driver. Thus, after the recipient has taken possession of the parcel at their home, the vehicle 12 can be moved to a position away from their home before switching from remotely operated driving to autonomous driving. This for example enables a delivery agent to be prevented from guessing the position of the recipient's home based on the remote driving end point, and thus offers even more superior privacy protection.

Moreover, in the vehicle control system 10, since the start point of remotely operated driving of the vehicle 12 by the recipient/related party is limited to the preliminary destination or within the preliminary destination area near to the location of the recipient, the distance over which the vehicle 12 is driven by remote operation is short, thereby suppressing inconvenience to the recipient/related party.

Note that in cases in which the recipient has selected a preliminary destination, the recipient is able to specify a place from which the route to the location of the recipient (such as their home) is easily driven by remote operation.

In cases in which the recipient has selected a preliminary destination area including their location (such as their home), the vehicle 12 is switched to the remotely operated driven state when the vehicle 12 arrives at the preliminary destination area, and so the degrees of freedom for selecting the travel route of the vehicle 12 are increased and a short autonomous driving distance can be set as a result, enabling the delivery time to be shortened.

Furthermore, in the vehicle control system 10, at the point in time when the vehicle 12 arrives at the preliminary destination/area, the arrival notification signal is transmitted to the remote controller device 40 so as to sound an alarm through the speaker 44 of the remote operation device 14, thereby enabling the remote driver, this being the recipient/related party, to easily recognize the remotely operated driving start timing.

In other words, switching of the vehicle 12 from autonomous driving to remotely operated driving is performed smoothly, thus achieving a shorter delivery time.

Other

Note that although explanation has been given regarding a case in which the vehicle control system 10 is switched from autonomous driving to remotely operated driving, setting may be made such that the vehicle control system 10 is switched from autonomous driving to manual driving. In such cases, when the vehicle 12 arrives at the preliminary destination or in the preliminary destination area, the vehicle 12 is stopped in a safe place and stands by while the vehicle 12 is switched from the autonomously driven state to the manually driven state. An arrival signal is transmitted to the remote controller device 40 so as to sound an alarm to make the recipient aware that the vehicle 12 has arrived, whereupon the recipient makes their way to the vehicle 12 and manually drives the vehicle 12 to the location of the recipient.

Although the vehicle 12 is switched from the autonomously driven state to the remotely operated driven state upon arriving at the preliminary destination or in the preliminary destination area in the above exemplary embodiment, the vehicle 12 may be temporally stopped in a safe place when this switching is performed. Specifically, the vehicle controller device 20 may stop the vehicle 12 in a safe place after transmitting the authority transfer command to the remote controller device 40 (step S216) as illustrated in FIG. 10. This allows for flexibility in the time taken for the recipient to operate the switch on the remote operation device 14 (for the remote driver to complete their preparation) after the authority transfer command illustrated in FIG. 11 has been received by the remote controller device 40 (step S304).

Namely, since the vehicle 12 temporally stops in a safe place in order for the vehicle 12 to switch from the autonomously driven state to the remotely operated driven state, the remote driver, this being the recipient/related party, is able to start the remotely operated driving at a timing that is convenient to them.

Although the vehicle control system 10 is applied to a parcel delivery system in the above exemplary embodiment, there is no limitation thereto. For example, the vehicle control system 10 may be applied as a system for taking children home from an educational institution. In such cases, a parent waiting at home operates the remote operation device 14 when the vehicle 12 has arrived at a preliminary destination or in a preliminary destination area near to their home, thereby enabling the vehicle 12 to be driven to the home by remote operation. The home address is thus not revealed to the educational institution. Namely, this system offers superior privacy protection.

Although the recipient/related party is notified that the vehicle 12 has arrived at the preliminary destination/area by sounding the alarm through the speaker 44 of the remote operation device 14 in the above exemplary embodiment, there is no limitation thereto. For example, notification may be performed by displaying an arrival message on the display device 42 of the remote operation device 14, or by illuminating an arrival lamp or the like on the remote operation device 14.

Furthermore, although the present exemplary embodiment is configured such that the position information is acquired at all times, configuration may be made such that the acquisition of position information by the position information acquisition section 230 is stopped when the vehicle 12 has arrived at the preliminary destination or in the preliminary destination area and has been switched from the autonomously driven state to the manually driven state or the remotely operated driven state. Thus, position information is not recorded when the parcel recipient causes the vehicle to travel from the preliminary destination to the location of the recipient, or within the preliminary destination area to the location of the recipient. Namely, since the delivery agent or the like is further suppressed from ascertaining the location of the parcel recipient, this system offers superior privacy protection for the user.

In such cases, configuration may be such that the position information acquisition section 230 starts to acquire position information again at the timing when the vehicle 12 returns to the autonomously driven state.

In the present exemplary embodiment, explanation has been given regarding a vehicle control system capable of switching between three states, these being manually driven, driven by remote operation, and autonomously driven states. However, the vehicle control system may be configured so as to be capable of switching been two states, these being the manually driven and autonomously driven states, or the driven by remote operation and autonomously driven states.

In cases in which the vehicle control system is only capable of switching being two states, these being the manually driven and autonomously driven states, configuration may be made in which all the configuration elements of the system are installed inside the vehicle.

The present disclosure provides a vehicle control system, a vehicle controller device and a vehicle control method that offer superior privacy protection.

A first aspect is a vehicle control system that includes: a preliminary destination/area setting section configured to set a preliminary destination or a preliminary destination area toward which a vehicle heads in an autonomously driven state; a travel control section configured to cause the vehicle to travel in the autonomously driven state to the preliminary destination or the preliminary destination area set by the preliminary destination/area setting section; a position information acquisition section configured to acquire position information for the vehicle; and a switchover section configured to switch a driving state of the vehicle from the autonomously driven state to a manually driven state or a remotely operated driven state when the vehicle has been detected to have arrived at the preliminary destination or in the preliminary destination area based on the position information.

In this vehicle control system, the vehicle is autonomously driven toward the set preliminary destination or preliminary destination area.

When the vehicle has been detected to have arrived at the preliminary destination or in the preliminary destination area based on the acquired position information for the vehicle, the vehicle is switched from the autonomously driven state to the manually driven state or the remotely operated driven state.

Thus, when a user of the vehicle control system sets a place or a locality that is different from the ultimate destination as the preliminary destination or the preliminary destination area, the vehicle can be autonomously driven to the preliminary destination or the preliminary destination area, and then manually driven or driven by remote operation from the preliminary destination or within the preliminary destination area to the ultimate destination by the user.

This eliminates the risk of the ultimate destination of the user becoming known to a manager of the vehicle control system, thereby offering superior privacy protection.

Note that "remotely operated driving" refers to an operator causing an operation-target vehicle to travel by operating the vehicle from a position away from the vehicle.

A second aspect is the vehicle control system of the first aspect, that further includes: a notification section configured to notify a driver of the vehicle when in the manually driven state, or to notify a remote driver of the vehicle when in the remotely operated driven state, that the vehicle has arrived at the preliminary destination or in the preliminary destination area when the vehicle has been detected to have arrived at the preliminary destination or in the preliminary destination area based on the position information.

In this vehicle control system, when the vehicle has been detected to have arrived at the preliminary destination or in the preliminary destination area based on the acquired position information for the vehicle, the driver of the vehicle (when in the manually driven state) or the remote driver of the vehicle (when in the remotely operated driven state) is notified that the vehicle has arrived at the preliminary destination or in the preliminary destination area.

This enables the driver of the vehicle (when in the manually driven state) or the remote driver of the vehicle (when in the remotely operated driven state) to be made aware that the vehicle can be driven. Namely, this enables the driving state of the vehicle to be switched smoothly.

A third aspect is the vehicle control system of the first or second aspect, wherein: the vehicle is a vehicle configured to deliver a parcel; and the vehicle is capable of being manually driven or driven by remote operation by a recipient of the parcel from the preliminary destination to a delivery site of the parcel.

This vehicle control system enables the vehicle delivering the parcel to travel to the preliminary destination by autonomous driving, and to travel from the preliminary destination to the delivery site by being manually driven or driven by remote operation by the recipient of the parcel. This suppresses the risk of the address of the recipient, this being the delivery site, from becoming known to a delivery agent or the like, and thus offers excellent privacy protection.

A fourth aspect is the vehicle control system of the first or second aspect, wherein: the vehicle is a vehicle configured to deliver a parcel; the preliminary destination area is a locality including a delivery site of the parcel; and the vehicle is capable of being manually driven or driven by remote operation by a recipient of the parcel to the delivery site of the parcel within the preliminary destination area.

In this vehicle control system, since the preliminary destination area is a locality including the delivery site of the parcel, the vehicle delivering the parcel can travel to the preliminary destination area by autonomous driving, and travel within the preliminary destination area to the delivery site by being manually driven or driven by remote operation by the recipient of the parcel. This suppresses the risk of the address of the recipient, this being the delivery site, from becoming known to a delivery agent or the like, and thus offers excellent privacy protection.

A fifth aspect is the vehicle control system of any of the first to fourth aspects, wherein the vehicle is configured to temporally stop on arriving at the preliminary destination or in the preliminary destination area.

In this vehicle control system, the vehicle temporally stops on arriving at the preliminary destination or in the preliminary destination area. There is thus no need for the user to drive the vehicle immediately even when the vehicle has switched from the autonomously driven state to the manually driven state or the remotely operated driven state. Namely, the user is able to cause the vehicle to travel to the ultimate destination by manual driving or remotely operated driving at a timing convenient to the user.

A sixth aspect is the vehicle control system of any of the first to fifth aspects, wherein the position information acquisition section is configured to stop acquisition of the position information when the vehicle is in the manually driven state or the remotely operated driven state.

In this vehicle control system, acquisition of the position information is stopped when the vehicle is in the manually driven state or the remotely operated driven state. Accordingly, the position information is not recorded when the user causes the vehicle to travel to the ultimate destination from the preliminary destination or to the ultimate destination within the preliminary destination area. Namely, this further suppresses a manager of the system from ascertaining the ultimate destination of the user, and thus offers superior privacy protection for the user.

A seventh aspect is a vehicle controller device that includes: a travel control section configured to cause a vehicle to travel in an autonomously driven state to a set preliminary destination or a set preliminary destination area; a position information acquisition section configured to acquire position information for the vehicle; and a switchover section configured to switch a driving state of the vehicle from the autonomously driven state to a manually driven state or a remotely operated driven state when the vehicle has been detected to have arrived at the preliminary destination or in the preliminary destination area based on the position information.

In this vehicle controller device, the vehicle is autonomously driven toward the set preliminary destination or preliminary destination area.

When the vehicle has been detected to have arrived at the preliminary destination or in the preliminary destination area based on the acquired position information for the vehicle, the vehicle is switched from the autonomously driven state to the manually driven state or the remotely operated driven state.

Thus, when a user of the vehicle controller device sets a place or a locality that is different from the ultimate destination as the preliminary destination or the preliminary destination area, the vehicle can be autonomously driven to the preliminary destination or the preliminary destination area, and then manually driven or driven by remote operation from the preliminary destination or within the preliminary destination area to the ultimate destination by the user.

This eliminates the risk of the ultimate destination of the user becoming known to a manager of the vehicle controller device, thereby offering superior privacy protection.

An eighth aspect is the vehicle controller device of the seventh aspect, wherein: when the vehicle has been detected to have arrived at the preliminary destination or in the preliminary destination area based on the position information, a driver of the vehicle when in the manually driven state or a remote driver of the vehicle when in the remotely operated driven state is notified of the fact that the vehicle has arrived at the preliminary destination or in the preliminary destination area.

In this vehicle controller device, when the vehicle has been detected to have arrived at the preliminary destination or in the preliminary destination area based on the acquired position information for the vehicle, the driver of the vehicle (when in the manually driven state) or the remote driver of the vehicle (when in the remotely operated driven state) is notified that the vehicle has arrived at the preliminary destination or in the preliminary destination area.

This enables the driver of the vehicle (when in the manually driven state) or the remote driver of the vehicle (when in the remotely operated driven state) to be made aware that the vehicle can be driven. Namely, this enables the driving state of the vehicle to be switched smoothly.

A ninth aspect is the vehicle controller device of the seventh or eighth aspect, wherein: the vehicle is a vehicle configured to deliver a parcel; and the vehicle is capable of being manually driven or driven by remote operation by a recipient of the parcel from the preliminary destination to a delivery site of the parcel.

This vehicle controller device enables the vehicle delivering the parcel to travel to the preliminary destination by autonomous driving, and to travel from the preliminary destination to the delivery site by being manually driven or driven by remote operation by the recipient of the parcel. This suppresses the risk of the address of the recipient, this being the delivery site, from becoming known to a delivery agent or the like, and thus offers excellent privacy protection.

A tenth aspect is the vehicle controller device of the seventh or eighth aspect, wherein: the vehicle is a vehicle configured to deliver a parcel; the preliminary destination area is a locality including a delivery site of the parcel; and the vehicle is capable of being manually driven or driven by remote operation by a recipient of the parcel to the delivery site of the parcel within the preliminary destination area.

In this vehicle controller device, since the preliminary destination area is a locality including the delivery site of the parcel, the vehicle delivering the parcel can travel to the preliminary destination area by autonomous driving, and travel within the preliminary destination area to the delivery site by being manually driven or driven by remote operation by the recipient of the parcel. This suppresses the risk of the address of the recipient, this being the delivery site, from becoming known to a delivery agent or the like, and thus offers excellent privacy protection.

An eleventh aspect is the vehicle controller device of any of the seventh to tenth aspects, wherein the vehicle is configured to temporally stop on arriving at the preliminary destination or in the preliminary destination area.

In this vehicle controller device, the vehicle temporally stops on arriving at the preliminary destination or in the preliminary destination area. There is thus no need for the user to drive the vehicle immediately even when the vehicle has switched from the autonomously driven state to the manually driven state or the remotely operated driven state. Namely, the user is able to cause the vehicle to travel to the ultimate destination by manual driving or remotely operated driving at a timing convenient to the user.

A twelfth aspect is the vehicle controller device of any of the seventh to eleventh aspects, wherein the position information acquisition section is configured to stop acquisition of the position information when the vehicle is in the manually driven state or the remotely operated driven state.

In this vehicle controller device, acquisition of the position information is stopped when the vehicle is in the manually driven state or the remotely operated driven state. Accordingly, the position information is not recorded when the user causes the vehicle to travel to the ultimate destination from the preliminary destination or to the ultimate destination within the preliminary destination area. Namely, this further suppresses a manager of the device from ascertaining the ultimate destination of the user, and thus offers superior privacy protection for the user.

The above features may be also realized in the form of the vehicle control methods.

As described above, the vehicle control system and vehicle controller device of the present disclosure offer superior privacy protection to the user.

The invention claimed is:

1. A vehicle control system comprising:
   a memory; and
   a first processor that is coupled with the memory and that is configured to:
     set a preliminary destination or a preliminary destination area toward which a vehicle heads in an autonomously driven state;
     cause a vehicle to travel in the autonomously driven state to the preliminary destination or the preliminary destination area;
     acquire, from a global positioning system (GPS) device, position information for the vehicle;
     switch a driving state of the vehicle from the autonomously driven state to a remotely operated driven state when the vehicle has been detected to have arrived at the preliminary destination or in the preliminary destination area based on the position information; and
     stop acquisition of the position information, without recording the position information, when the vehicle is in the remotely operated driven state.

2. The vehicle control system of claim 1, further comprising:
   a second processor that is configured to notify a remote driver of the vehicle when in the remotely operated driven state, that the vehicle has arrived at the preliminary destination or in the preliminary destination area when the vehicle has been detected to have arrived at the preliminary destination or in the preliminary destination area based on the position information acquired by the first processor.

3. The vehicle control system of claim 1, wherein:
   the vehicle is configured to deliver a parcel; and
   the vehicle is capable of being driven by remote operation by a recipient of the parcel from the preliminary destination to a delivery site of the parcel.

4. The vehicle control system of claim 1, wherein:
   the vehicle is configured to deliver a parcel;
   the preliminary destination area is a locality including a delivery site of the parcel; and the vehicle is capable of being driven by remote operation by a recipient of the parcel to the delivery site of the parcel within the preliminary destination area.

5. The vehicle control system of claim 1, wherein the vehicle is configured to temporally stop on arriving at the preliminary destination or in the preliminary destination area.

6. A vehicle controller device comprising:
a memory; and
a processor that is coupled with the memory and that is configured to:
   cause a vehicle to travel in an autonomously driven state to a set preliminary destination or a set preliminary destination area;
   acquire, from a global positioning system (GPS) device, position information for the vehicle;
   switch a driving state of the vehicle from the autonomously driven state to a remotely operated driven state when the vehicle has been detected to have arrived at the preliminary destination or in the preliminary destination area based on the position information; and
   stop acquisition of the position information, without recording the position information, when the vehicle is in the remotely operated driven state.

7. The vehicle controller device of claim 6, wherein:
when the vehicle has been detected to have arrived at the preliminary destination or in the preliminary destination area based on the position information, a remote driver of the vehicle when in the remotely operated driven state is notified that the vehicle has arrived at the preliminary destination or in the preliminary destination area.

8. The vehicle controller device of claim 6, wherein:
the vehicle is configured to deliver a parcel; and
the vehicle is capable of being driven by remote operation by a recipient of the parcel from the preliminary destination to a delivery site of the parcel.

9. The vehicle controller device of claim 6, wherein:
the vehicle is configured to deliver a parcel;
the preliminary destination area is a locality including a delivery site of the parcel; and
the vehicle is capable of being driven by remote operation by a recipient of the parcel to the delivery site of the parcel within the preliminary destination area.

10. The vehicle controller device of claim 6, wherein the vehicle is configured to temporally stop on arriving at the preliminary destination or in the preliminary destination area.

11. A vehicle control method implemented by a processor, the method comprising:
causing a vehicle to travel in an autonomously driven state to a set preliminary destination or a set preliminary destination area;
acquiring, from a global positioning system (GPS) device, position information for the vehicle;
switching a driving state of the vehicle from the autonomously driven state to a remotely operated driven state when the vehicle has been detected to have arrived at the preliminary destination or in the preliminary destination area based on the position information; and
stopping acquisition of the position information, without recording the position information, when the vehicle is in the remotely operated driven state.

12. The vehicle control method of claim 11, wherein:
when the vehicle has been detected to have arrived at the preliminary destination or in the preliminary destination area based on the position information, a remote driver of the vehicle when in the remotely operated driven state is notified that the vehicle has arrived at the preliminary destination or in the preliminary destination area.

13. The vehicle control method of claim 11, wherein the vehicle is configured to temporally stop on arriving at the preliminary destination or in the preliminary destination area.

* * * * *